United States Patent
Lai et al.

(10) Patent No.: US 10,341,471 B2
(45) Date of Patent: Jul. 2, 2019

(54) PACKET ANALYSIS APPARATUS, METHOD, AND NON-TRANSITORY COMPUTER READABLE MEDIUM THEREOF

(71) Applicant: ONWARD SECURITY CORPORATION, New Taipei (TW)

(72) Inventors: Chao Yeh Lai, New Taipei (TW);
Chien Tsung Liu, New Taipei (TW);
Yu Chieh Li, New Taipei (TW)

(73) Assignee: ONWARD SECURITY CORPORATION, New Taipei (TW)

( * ) Notice: Subject to any disclaimer, the term of this patent is extended or adjusted under 35 U.S.C. 154(b) by 194 days.

(21) Appl. No.: 15/394,630

(22) Filed: Dec. 29, 2016

(65) Prior Publication Data

US 2018/0191874 A1 Jul. 5, 2018

(51) Int. Cl.
*H04L 29/06* (2006.01)
*H04L 1/00* (2006.01)

(52) U.S. Cl.
CPC ............ *H04L 69/22* (2013.01); *H04L 1/0091* (2013.01)

(58) Field of Classification Search
CPC ...... H04L 63/1425; H04L 27/06; H04L 69/22
See application file for complete search history.

(56) References Cited

U.S. PATENT DOCUMENTS

| | | | |
|---|---|---|---|
| 9,906,545 B1 * | 2/2018 | Zhao | H04L 63/123 |
| 2004/0028157 A1* | 2/2004 | Aoki | H04B 7/0848 |
| | | | 375/347 |
| 2005/0091566 A1* | 4/2005 | Berens | H03M 13/2957 |
| | | | 714/755 |

OTHER PUBLICATIONS

Choi, Kibum, et al., "Dissecting Customized Protocols: Automatic Analysis for Customized Protocols based on IEEE 802.15.4," Proceeding of the 9$^{th}$ ACM Conference on Security and Privacy in Wireless and Mobile Networks, ACM, pp. 183-193 (Jul. 8, 2016).

(Continued)

Primary Examiner — Zhensheng Zhang
(74) Attorney, Agent, or Firm — Christensen, Fonder, Dardi & Herbert PLLC

(57) ABSTRACT

A packet analysis apparatus, method, and non-transitory computer readable medium thereof are provided. The packet analysis apparatus stores a plurality of packets whose formats are unknown. The packet analysis apparatus calculates a plurality of cross-correlation values of the packets. The packet analysis apparatus decides at least one group according to the cross-correlation values and at least one first threshold, wherein each group includes a subset of the packets. The packets included in a specific group of the groups define a plurality of bit positions. Each packet included in the specific group has a plurality of bits. For each of the bit positions, the packet analysis apparatus calculates a variation degree of the bits corresponding to the bit positions. The packet analysis apparatus selects the at least one bit position whose variation degree(s) is/are smaller than a second threshold as at least one field boundary of the specific group.

17 Claims, 7 Drawing Sheets

(56) References Cited

OTHER PUBLICATIONS

Markovitz, Moti, et al., "Field Classification, Modeling and Anomaly Detection in Unknown CAN Bus Networks," *Proceedings of the Embedded Security in Cars Conference* (*ESCAR 2015*), 10 pages (Oct. 13, 2015).

Cui, Weidong, et al., "*Discoverer*: Automatic Protocol Reverse Engineering from Network Traces," *Proceedings of the $16^{th}$ Security Symposium*, pp. 199-212 (2007).

Sakurai, Y., "Stream mining technologies for time-series data," *IPSJ Magazine*, vol. 47, No. 7, pp. 755-761 (Jul. 2006).

\* cited by examiner

PACKET ANALYSIS APPARATUS, METHOD, AND NON-TRANSITORY COMPUTER READABLE MEDIUM THEREOF

CROSS-REFERENCES TO RELATED APPLICATIONS

Not applicable.

BACKGROUND OF THE INVENTION

Field of the Invention

The present invention relates to a packet analysis apparatus, method, and non-transitory computer readable medium thereof. More particularly, the present invention relates to an apparatus, method, and non-transitory computer readable medium thereof for analyzing packets whose formats are unknown.

Descriptions of the Related Art

Owing to the rapid advancement of the information technology, various kinds of packet formats (e.g., packet formats of different communication protocols, different data storage formats, and different image formats) have been formulated by a lot of information industry practitioners and research institutes based on different needs and different considerations. Nevertheless, not all the packet formats comply with the international standard.

Many applications (e.g., fuzz testing) must know the packet format (e.g., the number of fields and the length of each field) beforehand in order to be executed efficiently and/or correctly. Currently, there are some technologies that can analyze packets of unknown formats, which compares the features of a format-unknown packet with the features of a format-known packet. The shortcoming of these technologies is that the format of the format-unknown packet cannot be decided if no similar feature is found. Accordingly, there is still a need for a technology that can analyze the format of a packet whose format is unknown.

SUMMARY OF THE INVENTION

An objective of the present invention is to provide a packet analysis apparatus. The packet analysis apparatus comprises a storage unit and a processing unit, wherein the storage unit and the processing unit are electrically connected with each other. The storage unit stores a plurality of packets whose formats are unknown. The processing unit is configured to calculate a plurality of cross-correlation values of the packets and decide at least one group according to the cross-correlation values and at least one first threshold, wherein each of the at least one group includes a subset of the packets. The packets included in a specific group among the at least one group define a plurality of bit positions, wherein each of the packets included in the specific group comprises a plurality of bits. The processing unit further calculates a variation degree of the bits corresponding to each of the bit positions and further selects the at least one bit position whose corresponding variation degree(s) is/are smaller than a second threshold as at least one field boundary of the specific group.

Another objective of the present invention is to provide a packet analysis method adapted for an electronic computing apparatus. The packet analysis method comprises the following steps of: (a) calculating a plurality of cross-correlation values of a plurality of packets whose formats are unknown, (b) deciding at least one group according to the cross-correlation values and at least one first threshold, wherein each of the at least one group includes a subset of the packets, the packets included in a specific group among the at least one group define a plurality of bit positions, and each of the packets included in the specific group comprises a plurality of bits, (c) calculating a variation degree of the bits corresponding to each of the bit positions, and (d) selecting the at least one bit position whose corresponding variation degree(s) is/are smaller than a second threshold as at least one field boundary of the specific group.

A further objective of the present invention is to provide a non-transitory computer readable medium having a computer program stored therein. The computer program executes the aforesaid packet analysis method after being loaded into an electronic computing apparatus.

Generally speaking, the packet analysis technology (including the apparatus, the method, and the non-transitory computer readable medium) provided in the present invention decides at least one group according to the correlations among a plurality of packets and then decides the field boundaries of packets included in at least one group. These fields may be provided to the user for reference (e.g., for reference in formulation of fuzz testing policies). The packet analysis technology (including the apparatus, the method, and the non-transitory computer readable medium) provided in the present invention may further analyze properties (e.g., bit value probability and bit value bias degree) of each of the bit positions for the at least one group and/or determine whether packets included in the at least one group have a length indicator field. Further, the packet analysis technology (including the apparatus, the method, and the non-transitory computer readable medium) provided in the present invention may also analyze whether a packet has a periodical property. These different pieces of information may all be provided to the user for further analyses.

The detailed technology and preferred embodiments implemented for the subject invention are described in the following paragraphs accompanying the appended drawings for a person of ordinary skill in the art to well appreciate the features of the claimed invention.

DESCRIPTION OF THE PREFERRED EMBODIMENT

In the following description, the packet analysis apparatus, method, and non-transitory computer readable medium thereof according to the present invention will be explained with reference to embodiments thereof. However, these embodiments are not intended to limit the present invention to any specific environment, applications, or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction. In addition, dimensions of individual elements and dimensional relationships among the individual elements in the attached drawings are provided only for purpose of illustration, but not to limit the scope of the present invention.

Figure 1A:
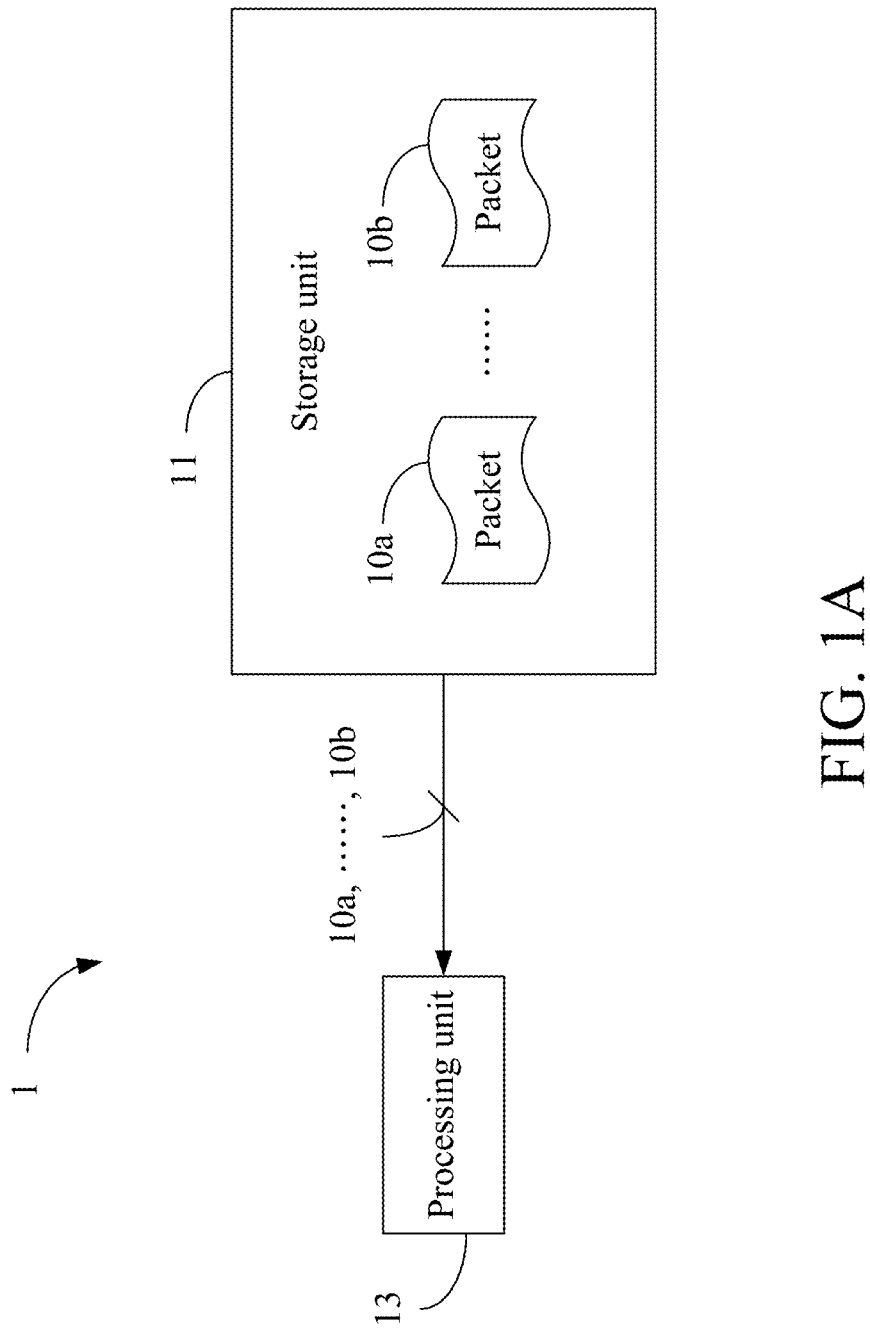
FIG. 1A illustrates a schematic view the architecture of the packet analysis apparatus 1 of the first embodiment.

A first embodiment of the present invention is a packet analysis apparatus 1 and a schematic architecture view of which is shown in FIG. 1A. The packet analysis apparatus 1 comprises a storage unit 11 and a processing unit 13, wherein the storage unit 11 and the processing unit 13 are electrically connected with each other. The storage unit 11 may be a memory, a Universal Serial Bus (USB) disk, a hard disk, a Compact Disk (CD), a mobile disk, or any other storage medium or circuit that has similar functionality and known to a person of ordinary skill in the art. The processing unit 13 may be any of various processors, Central Processing Units (CPUs), microprocessors, or other computing apparatuses known to a person of ordinary skill in the art.

The storage unit 11 stores a plurality of packets $10a, \ldots, 10b$, wherein each of the packets $10a, \ldots, 10b$ comprises a plurality of bits. The formats (e.g., the communication protocols) of the packets $10a, \ldots, 10b$ are unknown; in other words, the number of fields and the length of each field in each of the packets $10a, \ldots, 10b$ are unknown. In this embodiment, the packet analysis apparatus 1 decides at least one group according to the correlations among the packets $10a, \ldots, 10b$ and then decides field boundaries of the packets included in at least one of the at least one group.

First, how the packet analysis apparatus 1 calculates correlations among the packets $10a, \ldots, 10b$ will be described. In this embodiment, the processing unit 13 calculates a plurality of cross-correlation values of the packets $10a, \ldots, 10b$, wherein each of the cross-correlations values is related to two of the packets $10a, \ldots, 10b$. Specifically, the processing unit 13 may calculate a cross-correlation value for each of the combinations formed by any two of the packets $10a, \ldots, 10b$.

In some embodiments, the processing unit 13 may first decide a numeric sequence of each of the packets $10a, \ldots, 10b$ according to a cross-correlation value calculation length, wherein the cross-correlation value calculation length may be a preset length. Specifically, for each of the packets $10a, \ldots, 10b$, the processing unit 13 takes a subset (e.g., the first L bits, wherein L is the cross-correlation value calculation length and is a positive integer) of the bits included in the packet as the numeric sequence of the packet according to the cross-correlation value calculation length. Additionally, the processing unit 13 calculates an inner product value of the numeric sequences (i.e., a value obtained by performing an inner product on the two numeric sequences) corresponding to each of the combinations formed by any two of the packets and takes the inner product value as the cross-correlation value. It shall be appreciated that each of the numeric sequences has a length (i.e., the number of numeric/bits in the numeric sequence), wherein the lengths of the numeric sequences are identical (i.e., all the lengths are equal to the cross-correlation value calculation length). For ease of understanding, the numeric sequences of the packets $10a, \ldots, 10b$ and the cross-correlation values decided by the processing unit 13 are represented by the following mathematical symbols:

$\vec{P}_i$: the numeric sequence corresponding to the $i^{th}$ packet, where $i \in \{0, 1, \ldots, M-1\}$;

$\vec{P}_j$: the numeric sequence corresponding to the $j^{th}$ packet, where $j \in \{0, 1, \ldots, M-1\}$;

$L_{\vec{P}_i}$: the length of the numeric sequence corresponding to the $i^{th}$ packet;

$\vec{V}_{ik}$: the value of the $k^{th}$ bit of the $i^{th}$ packet, where $\vec{V}_{ik} = \{0,1\}$, $k \in \{0, 1, \ldots, L_{\vec{P}_i}-1\}$;

$\vec{P}_{ik}$: the $k^{th}$ value of the numeric sequence of the $i^{th}$ packet, where $\vec{P}_{ik} = (-1)^{\vec{V}_{ik}}$; and $\rho_{ij}$: the cross-correlation value between the $i^{th}$ packet and the $j^{th}$ packet, where $$\rho_{ij} = \left\langle \frac{\vec{P}_i}{\|\vec{P}_i\|}, \frac{\vec{P}_j}{\|\vec{P}_j\|} \right\rangle.$$

Regarding the above mathematical symbols representing the numeric sequences of the packets $10a, \ldots, 10b$, the parameter M represents the number of the packets $10a, \ldots 10b$. It is noted that taking the inner product value as the cross-correlation value is just an example, which is not used to limit the scope of the present invention. Since each cross-correlation value is used to represent the degree of similarity (or degree of correlation) between the two packets corresponding to the cross-correlation value, other numeric values that can represent the degree of similarity (or degree of correlation) between two packets (or two numeric sequences) may be used as cross-correlation values as well.

Figure 1B:
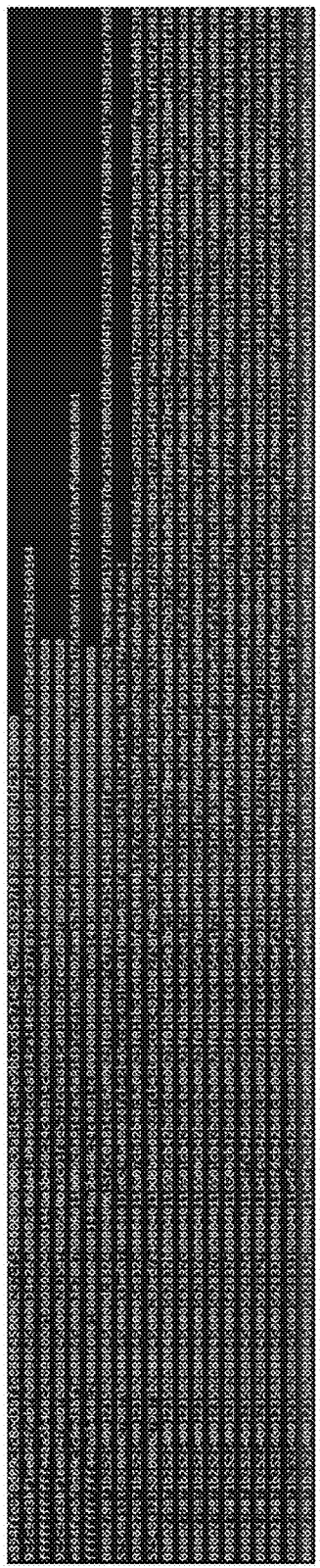
FIG. 1B illustrates an example of 20 packets.

For ease of understanding, the aforesaid operations will be detailed with reference to a specific example, which is, however, not intended to limit the scope of the present invention. Please refer to FIG. 1B, which illustrates 20 packets used in this example. In FIG. 1B, each row represents one packet, wherein the values of the bits included in each packet are represented in the hexadecimal form. The processing unit 13 decides a numeric sequence of each packet according to a cross-correlation value calculation length, where the numeric sequences are of the same length. Then, the processing unit 13 calculates an inner product value from the two numeric sequences corresponding to each of the combinations formed by any two of the packets, wherein the inner product values are the cross-correlation values. It is hereby assumed that the 20 packets are numbered from 0 to 19. Taking the $0^{th}$ packet as an example, it is assumed that the cross-correlation values calculated by the processing unit 13 (i.e., cross-correlation values between the $0^{th}$ packet and any other packets) include $\rho_{0,1}=0.595$, $\rho_{0,2}=0.5725$, $\Sigma_{0,3}=0.62$, $\rho_{0,4}=0.79$, $\rho_{0,5}=0.5725$, $\rho_{0,6}=0.66$, $\rho_{0,7}=0.585$, $\rho_{0,8}=0.555$, $\rho_{0,9}=0.56$, $\rho_{0,10}=0.5425$, $\rho_{0,11}=0.5925$, $\rho_{0,12}=0.565$, $\rho_{0,13}=0.6025$, $\rho_{0,14}=0.4775$, $\rho_{0,15}=0.4875$, $\rho_{0,16}=0.53$, $\rho_{0,17}=0.4975$, $\rho_{0,18}=0.5125$, and $\rho_{0,19}=0.5025$.

Next, the processing unit 13 decides at least one group according to the cross-correlation values and at least one first threshold, where each of the at least one group comprises a subset of the packets $10a, \ldots, 10b$. In some embodiments, the processing unit 13 may decide a first threshold for each of the packets $10a, \ldots, 10b$ and decides a group for each of the packets $10a, \ldots, 10b$ according to the first threshold of the packet. In some embodiments, the processing unit 13 may decide only one first threshold and then decide a group for each of the packets 10a, . . . , 10b according to the same first threshold. In some embodiments, the processing unit 13 may generate a group only for a certain one or more (but not all) of the packets 10a, . . . , 10b individually and the first thresholds used by the processing unit to generate the groups may be identical to each other or not.

For ease of understanding, the description continues with reference to the aforesaid specific example (i.e., the packet illustrated in FIG. 1B and the related data), which, however, is not intended to limit the scope of the present invention. In this specific example, the processing unit 13 decides at least one first threshold according to a subset of the cross-correlation values. Specifically, for the $0^{th}$ packet, the processing unit 13 calculates a first threshold according to cross-correlation values related to the $0^{th}$ packet (i.e., $\rho_{0,1}$, $\rho_{0,2}$, $\rho_{0,3}$, $\rho_{0,4}$, $\rho_{0,5}$, $\rho_{0,6}$, $\rho_{0,7}$, $\rho_{0,8}$, $\rho_{0,9}$, $\rho_{0,10}$, $\rho_{0,11}$, $\rho_{0,12}$, $\rho_{0,13}$, $\rho_{0,14}$, $\rho_{0,15}$, $\rho_{0,16}$, $\rho_{0,17}$, $\rho_{0,18}$ and $\rho_{0,19}$). As an example, the processing unit 13 may calculate an average value (approximately 0.569474) of the cross-correlation values related to the $0^{th}$ packet and take the average value as the first threshold of the $0^{th}$ packet. As another example, the processing unit 13 may take the average value plus a variance as the first threshold of the $0^{th}$ packet. It is hereby assumed that the average value of the cross-correlation values related to the $0^{th}$ packet is taken as the first threshold of the $0^{th}$ packet by the processing unit 13. Based on this assumption, the processing unit 13 groups the $0^{th}$ packet and the packets whose corresponding cross-correlation value is greater than the first threshold into the same group. Specifically, since the cross-correlation values $\rho_{0,1}$, $\rho_{0,3}$, $\rho_{0,4}$, $\rho_{0,6}$, $\rho_{0,11}$, $\rho_{0,13}$ are greater than the first threshold, the processing unit 13 decides that the $0^{th}$, the $1^{st}$, the $3^{rd}$, the $4^{th}$, the $6^{th}$, the $7^{th}$, the $11^{th}$, and the $13^{th}$ packets form one group. In this specific example, the processing unit 13 adopts the same approach to decide a first threshold for each of the rest packets individually and decide a group individually and, hence, the details will not be further described herein.

As described above, the processing unit 13 may decide only one first threshold and then decide a group for each of the $0^{th}$ to $19^{th}$ packets individually according to that single first threshold in some embodiments. In some embodiments, the processing unit 13 may generate a group only for a certain one or more (but not all) of the packets 10a, . . . , 10b individually (e.g., for only the $10^{th}$ packet), wherein the first thresholds used by the processing unit to generate the group(s) may be identical to each other or not. How the processing unit 13 implements variations of these embodiments can be understood by a person of ordinary skill in the art upon reviewing the aforesaid description, so this will not be further described herein.

After having decided the at least one group of the packets 10a, . . . , 10b, the processing unit 13 decides field boundaries of the packets included in the at least one group. In other words, the processing unit 13 may decide field boundaries of the packets in one of, several of, or all of the at least one group. For convenience of description, the group being processed by the processing unit 13 is called a specific group (not shown). The packets included in the specific group define a plurality of bit positions. Specifically, the processing unit 13 aligns the packets with respect to their most significant bits thereof (i.e., numbering the bits from the most significant bit for each of the packets), wherein the bit positions are defined by the packets that have been aligned. For example, the most significant bits of the packets all correspond to the $0^{th}$ bit position, and so on. Then, the processing unit 13 calculates a variation degree of the bits corresponding to each of the bit positions and selects the at least one bit position whose variation degree(s) is/are smaller than a second threshold as the at least one field boundary of the specific group. The main consideration of taking bit positions corresponding to small variation degrees as the field boundaries is that a more significant bit in a field usually has smaller variation degrees. In some embodiments, the processing unit 13 may calculate an average value of the variation degrees and take the average value as the second threshold. In some embodiments, the processing unit 13 may calculate an average value of the variation degrees and take the average value multiplied by a numeric value ranging between 0 and 1 as the second threshold.

For example, the processing unit 13 may calculate variation degrees of the bits corresponding to each of the bit positions according to Equation (1) and Equation (2) below. It shall be appreciated that Equation (1) and Equation (2) are not intended to limit the scope of the present invention.

$$E[C_j] = \frac{\sum_{i=0}^{M-1} (-1)^{c_{ij}}}{M} \quad (1)$$

$$\text{Var}[C_j] = E[C_j^2] - (E[C_j])^2 \quad (2)$$

In Equation (1) and Equation (2) above, the parameter M represents the number of packets in the specific group, the parameter $c_{ij}$ represents the bit value of the $i^{th}$ packet at the bit position j, $c_{ij} \in \{0,1\}$, $E[C_j]$ is the average value of the bits at the bit position j, and $\text{Var}[C_j]$ is the variance of the bits at the bit position j. In this specific example, the processing unit 13 adopts the variance $\text{Var}[C_j]$ as the variation degree of the bit position j. In this specific example, the processing unit 13 may select the bit position(s) whose the variance(s) $\text{Var}[C_j]$ is/are smaller than the second threshold as the at least one field boundary after the variances $\text{Var}[C_j]$ of all bit positions have been derived.

In some embodiments, the packet analysis apparatus 1 may further analyze the property of each bit position of the at least one group for reference by the user (e.g., for reference in formulation of fuzz testing policies). In other words, the processing unit 13 may analyze properties of each bit position of one of, several of, or all of the at least one group. Hereby, the aforementioned specific group will be taken as an example for further description. For each bit position of the specific group, the processing unit 13 calculates at least one bit value probability according to the bits corresponding to the bit position. For example, the processing unit 13 may calculate the bit value probability of a bit value being 1 according to Equation (3) below and calculate the bit value probability of a bit value being 0 according to Equation (4) below.

$$P(C_j = 1) = \frac{\sum_{i=0}^{M-1} c_{ij}}{M} \quad (3)$$

$$P(C_j = 0) = 1 - P(C_j = 1) \quad (4)$$

In Equation (3) and Equation (4), the parameter M represents the number of packets in the specific group, the parameter $C_{ij}$ represents the bit value of the $i^{th}$ packet at the bit position j, $c_{ij} \in \{0,1\}$, P(C=1) is the bit value probability that the bit value is 1, and P(C=0) is the bit value probability that the bit value is 0.

In some embodiments, for each bit position of the specific group, the processing unit 13 takes the result of subtracting each of the at least one bit value probability from 0.5 as a bit value bias degree. For example, the processing unit 13 may calculate a bit value bias degree of the bit value being 0 according to Equation (5) below and calculate a bit value bias degree of the bit value being 1 according to Equation (6) below.

$$\beta(C_j[0])=0.5-P(C_j=0) \qquad (5)$$

$$\beta(C_j[1])=0.5-P(C_j=1) \qquad (6)$$

In Equation (5) and Equation (6), $P(C_j=0)$ is the bit value probability that the bit value is 0, $P(C_j=1)$ is the bit value probability that the bit value is 1, $\beta(C_j[0])$ is the bit value bias degree that the bit value is 0, and $\beta(C_j[1])$ is the bit value bias degree that the bit value is 1.

In some embodiments, the processing unit 13 may further analyze the bit value bias degrees of all the bit positions, re-calculate the cross-correlation values of the packets 10a, . . . , 10b according to the analysis result, and re-generate groups in order to derive the groups more accurately. Specifically, the processing unit 13 determines that a specific region of the bit positions have a characteristic that the absolute values of the bit value bias degrees of the bit value being 1 are all smaller than a threshold, which means that the boundary of the header and the payload is likely to fall within this specific region. Accordingly, the processing unit 13 updates the cross-correlation value calculation length according to this specific region. After the cross-correlation value calculation length is updated, the processing unit 13 decides a numeric sequence of each of the packets 10a, . . . , 10b again according to the updated cross-correlation value calculation length, calculates the cross-correlation values of the packets 10a, . . . , 10b again, and generate the groups again. How the processing unit 13 calculates the cross-correlations of the packets 10a, . . . , 10b according to the updated cross-correlation value calculation length and generates the groups again will be understood by a person of ordinary skill in the art based on the above descriptions, so this will not be further described herein.

Figure 1C:
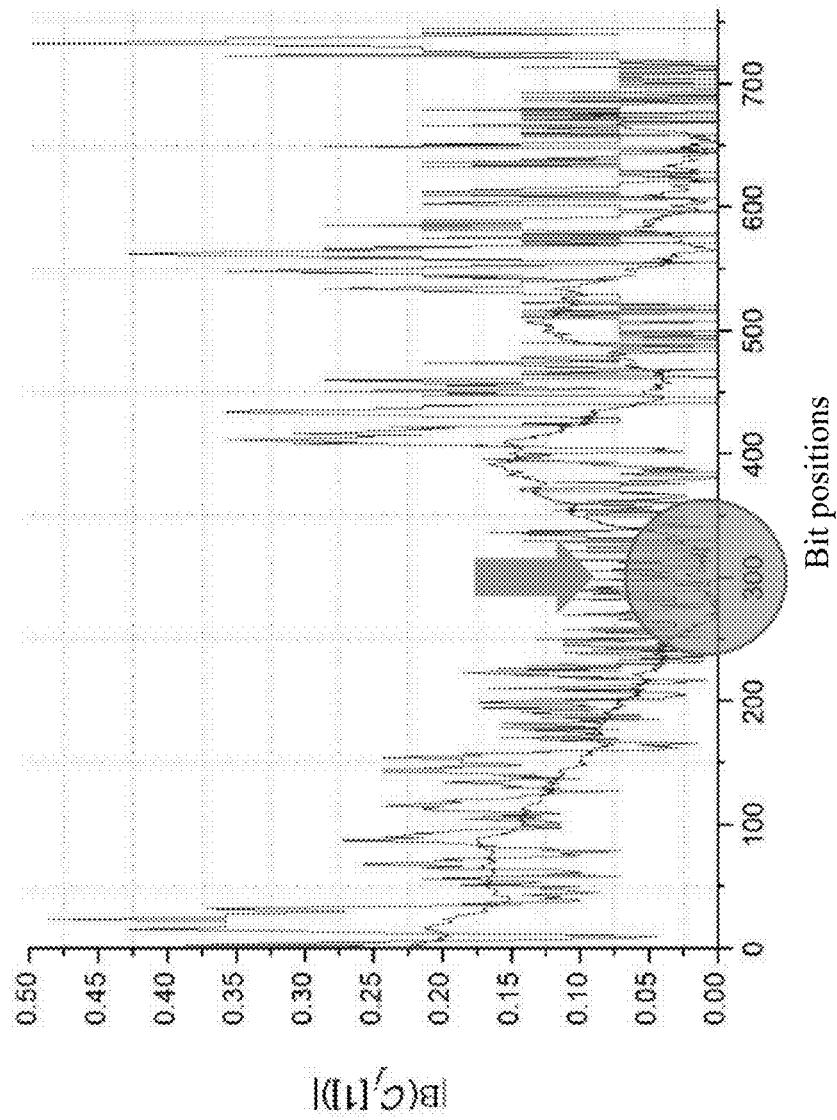
FIG. 1C illustrates an example of the bit positions and the bit value bias degrees.

To facilitate the understanding of the update of the cross-correlation value calculation length, please refer to a specific example illustrated in FIG. 1C. In FIG. 1C, the horizontal axis represents bit positions and the vertical axis represents the absolute values of the bit value bias degrees of the bit value being 1. In this specific example, the processing unit 13 determines that there is a specific region (i.e., from the $275^{th}$ bit position to the $325^{th}$ bit position) where the absolute values of the bit value bias degrees of the bit value being 1 are all smaller than a threshold. Therefore, the processing unit 13 takes $$\left\lfloor \frac{275}{8} \right\rfloor \times 8 = 272$$

as the cross-correlation value calculation length for the subsequent stage of cross-correlation value calculation and grouping.

In some embodiments, the packet analysis apparatus 1 may further determine, for at least one group, whether the packets included therein have a length indicator field (i.e., a field indicating the length of the payload in the packet) for reference by the user (e.g., for reference in formulation of fuzz testing polices). In other words, for one of, several of, or all of the at least one group, the processing unit 13 may determine whether packets included in the group(s) have a length indicator field. For ease of the description, the group being processed by the processing unit 13 is called the specific group (not shown). The packets included in the specific group define a plurality of byte positions and each of the packets included in the specific group has a packet length.

Specifically, the processing unit 13 decides a specific field according to a byte number and a specific byte position among the byte positions and then determines whether the specific field is the length indicator field. The byte number represents the number of bytes occupied by the length indicator field (if any), wherein the byte number may be a preset value or may be inputted by the user via an input interface (not shown). The processing unit 13 performs the following operations on each of the packets included in the specific group: (a) calculating an evaluation length according to the bits of the packet in the specific field and (b) subtracting the evaluation length, a value representing the specific byte position, and the byte number from the packet length of the packet to obtain a difference value. For a packet, if the difference value is smaller than a preset range, it means that it is very likely that the specific field is the length indicator field of the packet. After performing the above operations (a) and (b) on all the packets in the specific group, the processing unit 13 calculates the number of the difference values that are smaller than a preset range and determines whether the number is greater than a third threshold. If the number is greater than the third threshold, the processing unit 13 considers the specific field as the length indicator field of packets of the specific group. In some embodiments, the processing unit 13 may further calculate the accuracy of the determination result of the length indicator field. Specifically, the processing unit 13 may derive the accuracy by dividing the number of the difference values that are smaller than the preset range by the packet number of the specific group.

Figure 1D:
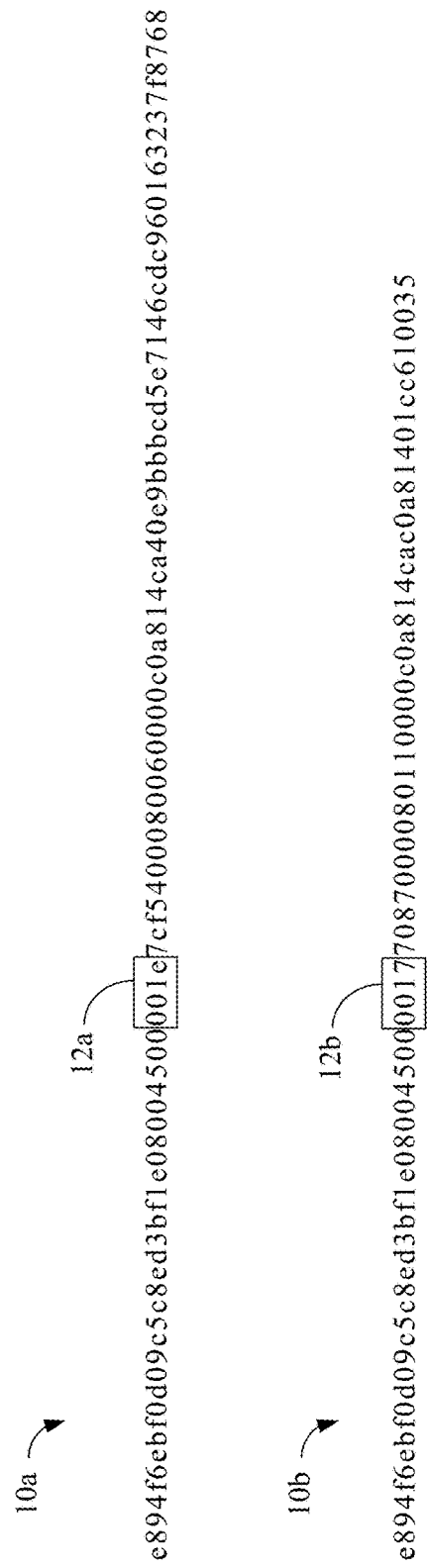
FIG. 1D illustrate an example of the specific field.

For ease of understanding, FIG. 1D will be taken as an example for description. It is hereby assumed that the specific group includes a plurality of packets and the packets 10a, 10b are two of the packets in the specific group. As shown in FIG. 1D, the bits included in the packets 10a, 10b are represented in the hexadecimal form and the packet length of the packets 10a, 10b are 46 bytes and 38 bytes respectively. In the specific example shown in FIG. 1D, the byte number (i.e., the number of bytes occupied by the length indicator field (if any)) is two bytes and the specific byte position is the $16^{th}$ byte (calculated from the $0^{th}$ byte). The processing unit 13 decides a specific field 12a, 12b for the packets 10a, 10b respectively according to the byte number and the specific byte position. For the packet 10a, the processing unit 13 calculates an evaluation length (i.e., $16^1 \times 1 + 16^0 \times 15 = 31$) according to the bits of the packet 10a in the specific field 12a and then subtracts the evaluation length, a numeric value representing the specific byte position, and the byte number from the packet length to obtain a difference value (i.e., 46−31−17−2=−4). For the packet 10b, the processing unit 13 calculates an evaluation length (i.e., $16^1 \times 1 + 16^0 \times 7 = 23$) according to the bits of the packet 10b the specific field 12b and then subtracts the evaluation length, a numeric value representing the specific byte position, and the byte number from the packet length to obtain a difference value (i.e., 38−23−17−2=−4). Similarly, the processing unit 13 calculates the evaluation length and then calculates the difference values for other packets. After all the packets included in the specific group have been processed, the processing unit 13 calculates the number (or percentage) of difference values that are smaller than a preset range (e.g., −5~+5) and then determines whether the number (or percentage) is greater than a third threshold. If the number (or the percentage) is greater than the third threshold, the processing unit 13 considers the specific field as the length indicator field of the packets of this packet group.

The aforementioned byte number, the specific byte position, and the specific field will be further described herein. In some embodiments, in order to find the specific field of a certain specific group, the processing unit 13 may test the $0^{th}$ byte position (i.e., taking the $0^{th}$ byte position as the specific byte position, deciding the specific field according to the specific byte position and the byte number, and then performing the aforesaid calculations and determination), then test the $1^{st}$ byte position, and so on. For those embodiments, since the processing unit 13 takes a plurality of different byte positions as specific byte positions for testing, there might be a plurality of byte positions of which the number (or percentage) of packets whose difference values is greater than the third threshold. When this situation happens, the processing unit 13 may select the specific field which cause the maximum number (or percentage) of packets whose difference values to be greater than the third threshold as the length indicator field of the packets of this packet group. Furthermore, in some embodiments, the processing unit 13 may set the byte number to be a plurality of different values and perform the aforesaid calculations and determination on the different values individually in the same approach, which will not be further described herein.

As described above, after the processing unit 13 has determined the length indicator field of a specific group, the processing unit 13 may further calculate the accuracy of the determination result of the length indicator field. A higher accuracy means that the grouping of the packets 10a, ..., 10b by the processing unit 13 is more accurate. Therefore, in some embodiments, the processing unit 13 may repeat the aforesaid operations to generate a more accurate grouping result for analysis.

Specifically, after the processing unit 13 has determined that the packets included in a specific group have a length indicator field and has calculated the accuracy of the determined length indicator field, the processing unit 13 may update the cross-correlation value calculation length (e.g., increase or decrease the cross-correlation value calculation length), calculate the cross-correlation values of the packets 10a, ..., 10b again (e.g., decide a numeric sequence of each of the packets 10a, ..., 10b again according to the cross-correlation value calculation length, and calculate the cross-correlation values of the packets 10a, ..., 10b according to the numeric sequences), generate the groups again, determine whether packets included in at least one group has a length indicator field again, and calculate the accuracy of the determination result of the length indicator field again (if there is a length indicator field). How the processing unit 13 repeats the aforesaid operations according to the updated cross-correlation value calculation length shall be understood by a person of ordinary skill in the art based on the aforesaid description, so the details will not be further described herein. The processing unit 13 may repeat the aforesaid operations until the accuracy has reached to a preset condition (e.g., higher than a threshold) or the aforesaid operations have been repeated for a preset number of times.

In some embodiments, the packet analysis apparatus 1 may further analyze whether any packet has a periodical property for reference by the user (e.g., for reference in formulation of fuzz testing policies). For ease of the description, the packet being processed by the processing unit 13 is called the specific packet (not shown) and described in a vector form. The dimension of each vector is the bit length of the longest specific packet. The processing unit 13 generates a first vector for this specific packet, wherein the first vector comprises a plurality of bits. The processing unit 13 then generates a plurality of second vectors by circularly shifting the first vector by a plurality of different shift bit numbers. The processing unit 13 further generates a plurality of third vectors by performing the modulo 2 addition on the first vector and each of the second vectors, where each of the third vectors comprises a plurality of bits. The processing unit 13 calculates an accumulated number of the bits whose value is equal to 1 for each of the third vectors. Afterwards, the processing unit 13 selects the shift bit number corresponding to the minimum accumulated number as a periodical property (i.e., the bits spaced apart by this interval have the same bit values) of the specific packet. For ease of understanding, the modulo 2 addition performed by the processing unit 13 is represented as Equation (7) below:

$$\vec{D}_F(k) = \vec{F}[i] \oplus \vec{F}[i+k], i \in \{0, 1, \ldots, L-1\} \quad (7)$$

In Equation (7) above, $\vec{F}[i]$ represents the first vector, $\vec{F}[i+k]$ represents the second vector, and $\vec{D}_F(k)$ represents the third vector. The processing unit 13 generates different second vectors by setting the variable k to be different values. The processing unit 13 calculates a Hamming Weight of each of the third vectors (i.e., $\vec{D}_F(k)$) (i.e., calculates the accumulated number of the bits whose value is equal to 1 in the third vector). A lower Hamming Weight of the third vector means that the first vector and the second vector used to calculate the third vector are more similar to each other. Therefore, the processing unit 13 may select the shift bit number corresponding to the minimum accumulated numbers as a periodical property of the specific packet. In some embodiments, in order to have a more accurate periodical property, the shift bit number can serve as the periodical property of the specific packet only when its corresponding accumulated number is the minimal one among the accumulated numbers and is smaller than a count threshold at the same time.

According to the above descriptions, the packet analysis apparatus 1 decides at least one group according to the correlations among the packets 10a, ..., 10b and then decides the field boundaries of packets included in the at least one group. These fields may be provided to the user for reference (e.g., for reference in formulation of fuzz testing policies). The packet analysis apparatus 1 may further analyze properties (e.g., bit value probability and bit value bias degree) of each of the bit positions for the at least one group and/or determine whether packets included in the at least one group have a length indicator field. Further, the packet analysis apparatus 1 may also analyze whether a packet has a periodical property. These different pieces of information may all be provided to the user for reference for further analyses.

Figure 2A:
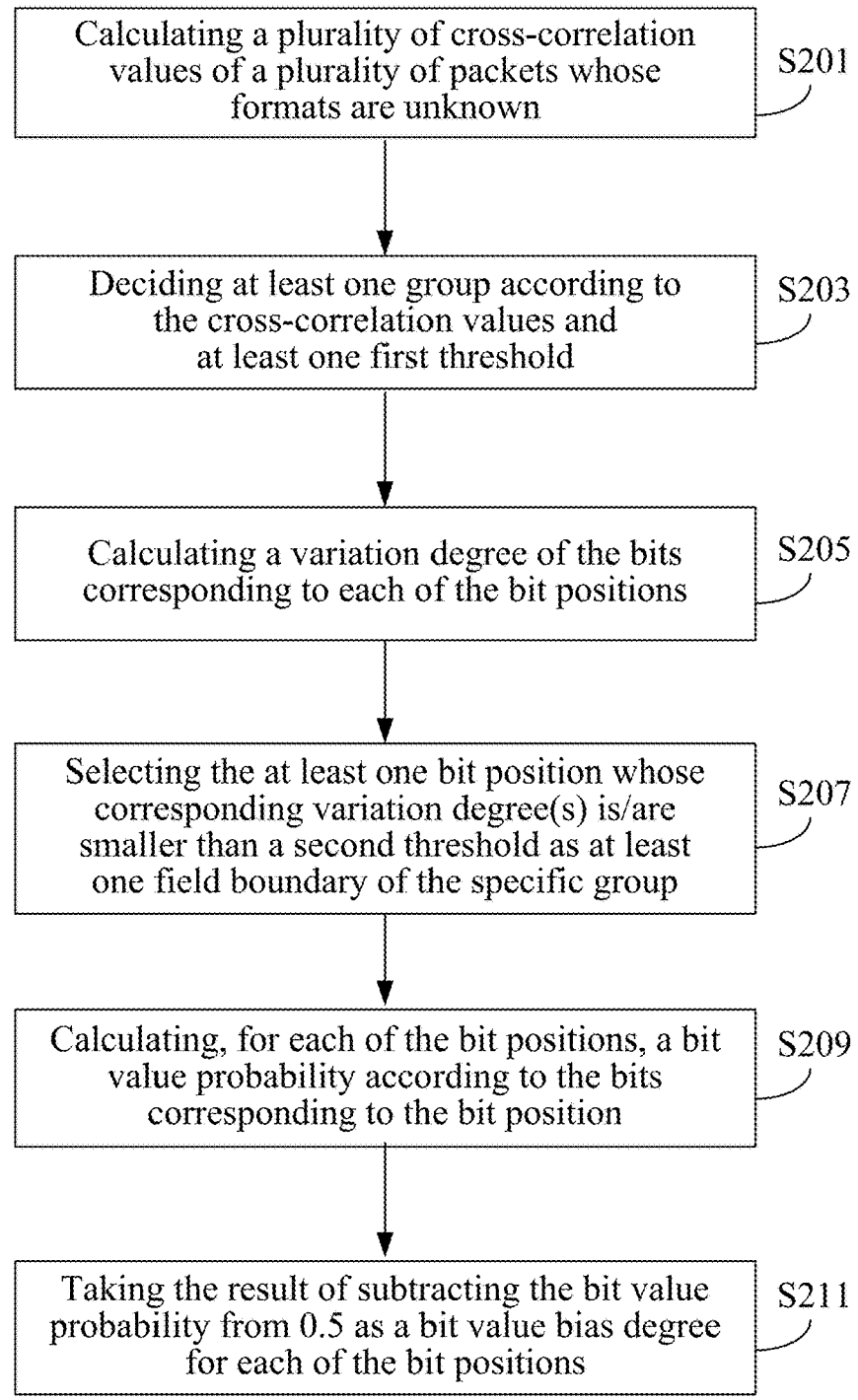
FIG. 2A illustrates the flowchart of the packet analysis method of the second embodiment.

A second embodiment of the present invention is a packet analysis method and a flowchart of which is shown in FIG. 2A. This packet analysis method is adapted for an electronic computing apparatus, e.g., the packet analysis apparatus 1 described in the first embodiment.

In step S201, the electronic computing apparatus calculates a plurality of cross-correlation values of a plurality of packets whose formats are unknown. Each of the cross-correlation values calculated in the step S201 is related to two of the packets. Specifically, the step S201 may calculate a cross-correlation value for each of the combinations formed by any two of the packets. In some embodiments, prior to the step S201, the packet analysis method may execute a step for deciding a numeric sequence for each of the packets according to a cross-correlation value calculation length, where the cross-correlation value calculation length may be a preset length. Specifically, for each of the packets, the electronic computing apparatus takes a subset (e.g., the first L bits, where L is the cross-correlation value calculation length and is a positive integer) of the bits included in the packet as the numeric sequence of the packet according to the cross-correlation value calculation length. In such embodiments, each of the cross-correlation values is an inner product value of two numeric sequences corresponding to two of the packets.

In step S203, the electronic computing apparatus decides at least one group according to the cross-correlation values and at least one first threshold, wherein each of the at least one group includes a subset of the packets. The packets included in a specific group among the at least one group define a plurality of bit positions and each of the packets included in the specific group comprises a plurality of bits. In some embodiments, each of the at least one first threshold is related to a subset of the cross-correlation values. Next in step S205, the electronic computing apparatus calculates a variation degree of the bits corresponding to each of the bit positions. In step S207, the electronic computing apparatus selects the at least one bit position whose corresponding variation degree(s) is/are smaller than a second threshold as at least one field boundary of the specific group.

In some embodiments, the packet analysis method further comprises the step S209 and the step S211 for analyzing the properties of each bit position of at least one group for user's reference (e.g., for reference in formulation of fuzz testing policies). In step S209, the electronic computing apparatus calculates, for each of the bit positions, a bit value probability according to the bits corresponding to the bit position. In step S211, the electronic computing apparatus takes the result of subtracting the bit value probability from 0.5 as a bit value bias degree for each of the bit positions.

Figure 2B:
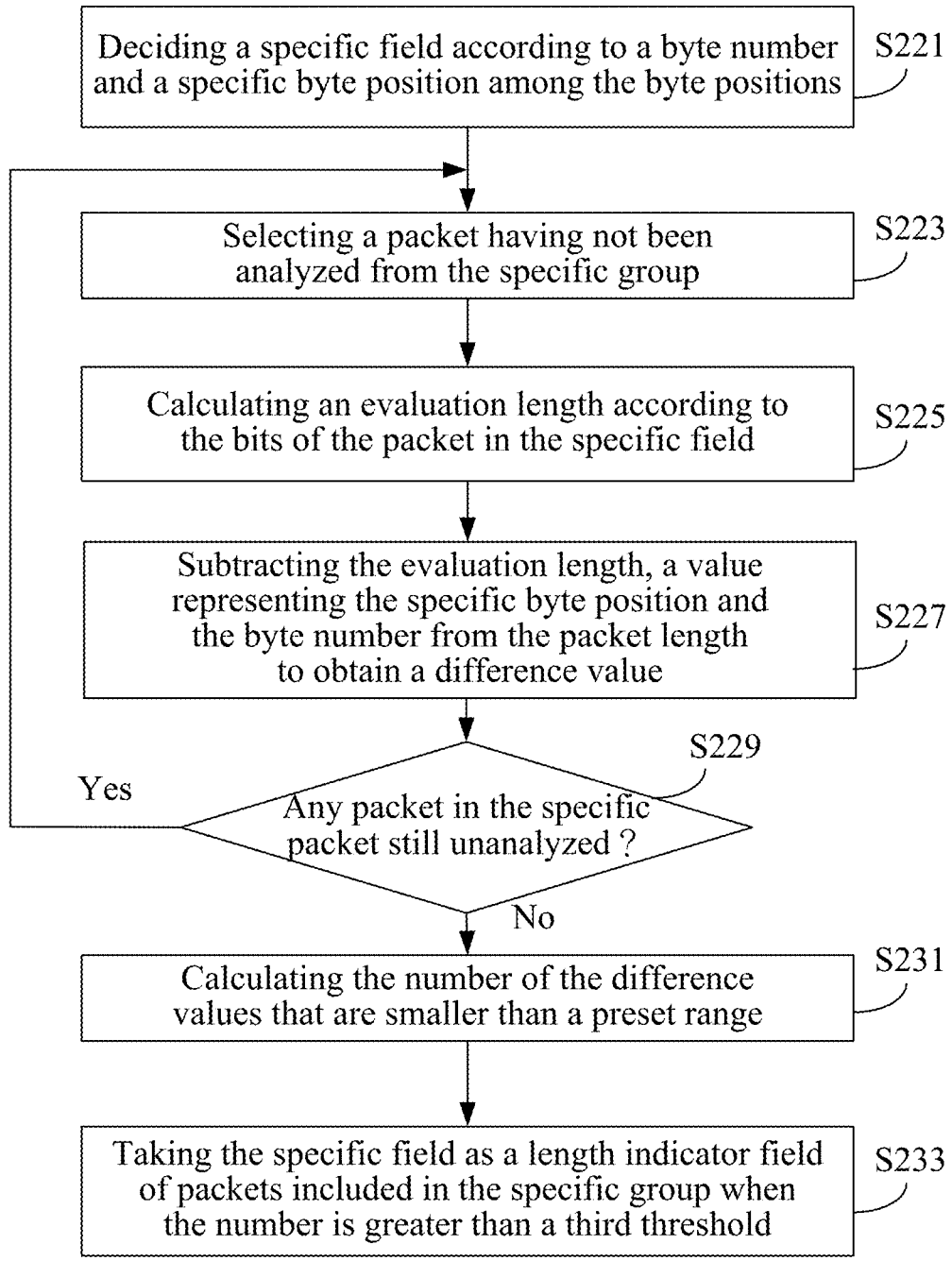
FIG. 2B illustrates the flowchart of the process for determining whether packets included in at least one group have the length indicator field.

In some embodiments, the packet analysis method further comprises the steps shown in FIG. 2B for determining, for at least one group, whether the packets included therein have a length indicator field (i.e., a field indicating the length of payload in the packet) for user's reference (e.g., for reference in formulation of fuzz testing polices). For those embodiments, the packets included in the specific group define a plurality of byte positions and each of the packets included in the specific group has a packet length.

In step S221, the electronic computing apparatus decides a specific field according to a byte number and a specific byte position among the byte positions. In step S223, the electronic computing apparatus selects a packet that has not been analyzed from the specific group. In step S225, the electronic computing apparatus calculates an evaluation length according to the bits of the packet in the specific field. In step S227, the electronic computing apparatus subtracts the evaluation length, a value representing the specific byte position, and the byte number from the packet length to obtain a difference value. Next in step S229, the electronic computing apparatus determines whether any packet in the specific packet still unanalyzed. If the determination result in the step S229 is "Yes," the steps S223 to S229 are repeated. If the determination result in the step S229 is "No," the electronic computing apparatus calculates the number of the difference values that are smaller than a preset range. Next in step S233, if the number is greater than a third threshold, the electronic computing apparatus takes the specific field as a length indicator field of the packets included in the specific group.

Figure 2C:
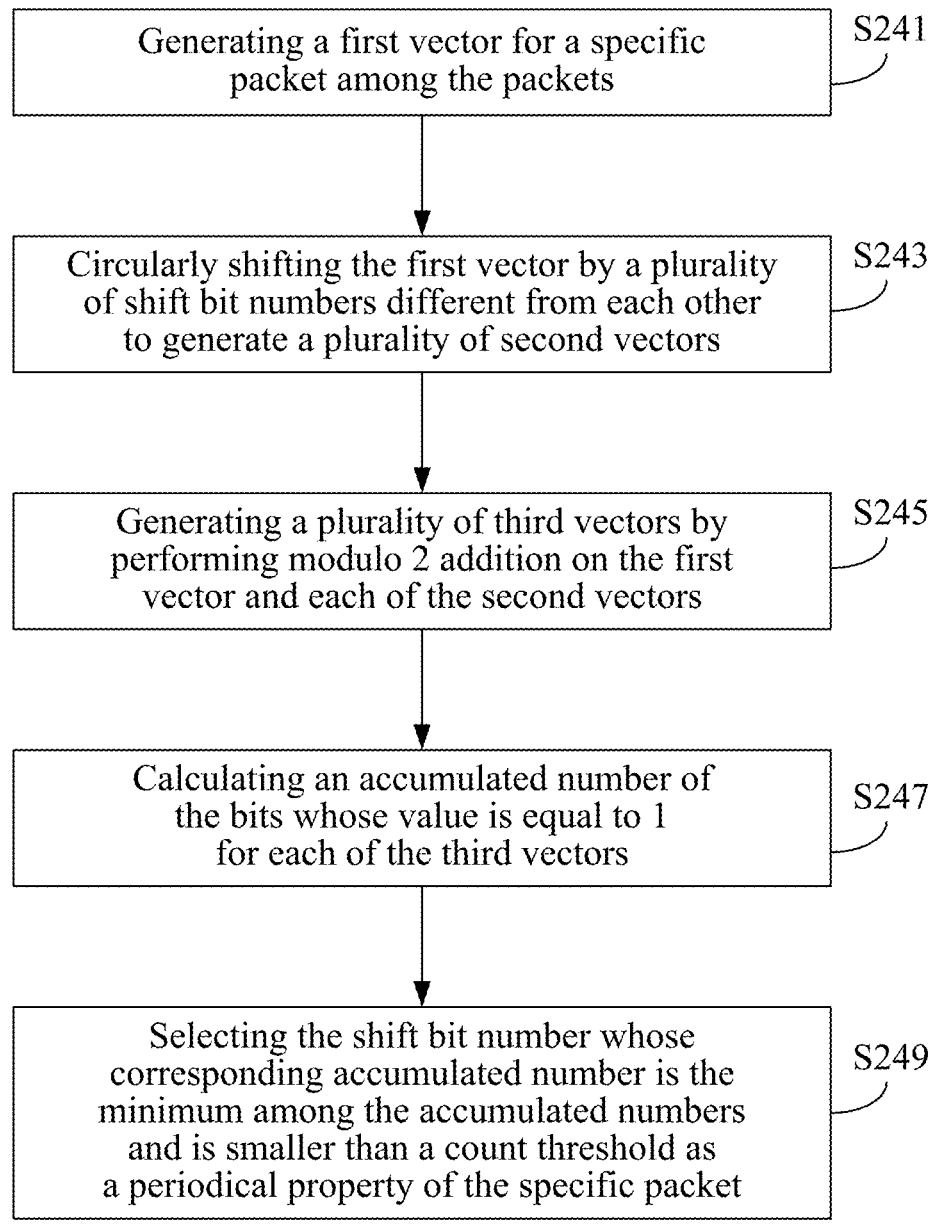
FIG. 2C illustrates the flowchart of the process for analyzing whether any packet has the periodical property.

In some embodiments, the packet analysis method further comprises steps shown in FIG. 2C for analyzing whether any packet has a periodical property for user's reference (e.g., for reference in formulation of fuzz testing policies). Specifically, in step S241, the electronic computing apparatus generates a first vector for a specific packet among the packets, wherein the first vector comprises a plurality of bits. In step S243, the electronic computing apparatus generates a plurality of second vectors by circularly shifts the first vector by a plurality of different shift bit numbers. In step S245, the electronic computing apparatus generates a plurality of third vectors by performing the modulo 2 addition on the first vector and each of the second vectors, wherein each of the third vectors comprises a plurality of bits. In step S247, the electronic computing apparatus calculates an accumulated number of the bits whose value is equal to 1 for each of the third vectors. In step S249, the electronic computing apparatus selects the shift bit number whose corresponding accumulated number is the minimum among the accumulated numbers and is smaller than a count threshold as a periodical property of the specific packet.

In addition to the aforesaid steps, the second embodiment can also execute all the operations and steps of, have the same functions, and deliver the same technical effects as the first embodiment. How the second embodiment executes these operations and steps, has the same functions, and delivers the same technical effects will be readily appreciated by a person of ordinary skill in the art based on the explanation of the first embodiment and, thus, will not be further described herein.

The packet analysis method described in the second embodiment may be implemented by a computer program comprising a plurality of codes. The computer program is stored in a non-transitory computer readable storage medium. When the codes comprised in the computer program are loaded into an electronic computing apparatus (e.g., the packet analysis apparatus 1 of the first embodiment), the packet analysis method described in the second embodiment is executed. The non-transitory computer readable storage medium may be an electronic product, e.g., a read only memory (ROM), a flash memory, a floppy disk, a hard disk, a compact disk (CD), a mobile disk, a magnetic tape, a database accessible to a network or any other storage medium known to a person of ordinary skill in the art and having the same functionality.

It shall be appreciated that, in the specification of the present invention, the terms "first," "second," and "third" used in the first threshold, the second threshold, and the third threshold are only intended to represent that the thresholds are different thresholds. The terms "first," "second," and "third" used in the first vector, the second vector, and the third vector are only intended to represent that the vectors are different vectors.

As can be known from the above descriptions, the packet analysis technology (including the apparatus, the method, and the non-transitory computer readable medium) provided in the present invention decides at least one group according to correlations among a plurality of packets and then decides the field boundaries of packets included in the at least one group. These fields may be provided to the user for reference (e.g., for reference in formulation of fuzz testing policies). The packet analysis technology (including the apparatus, the method, and the non-transitory computer readable medium) provided in the present invention may further analyze the properties (e.g., bit value probability and bit value bias degree) of each of the bit positions for the at least one group and/or determine whether the packets included in the at least one group have a length indicator field. Further, the packet analysis technology (including the apparatus, the method, and the non-transitory computer readable medium) provided in the present invention may also analyze whether a packet has a periodical property. These different pieces of information may all be provided to the user for reference for further analyses.

The above disclosure is related to the detailed technical contents and inventive features thereof. A person of ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A packet analysis apparatus, comprising:
   a storage unit, storing a plurality of packets, wherein a format of each of the packets is unknown; and
   a processing unit, being electrically connected to the storage unit and configured to calculate a plurality of cross-correlation values of the packets and decide at least one group according to the cross-correlation values and at least one first threshold, each of the at least one group including a subset of the packets,
   wherein the packets included in a specific group among the at least one group define a plurality of bit positions, each of the packets included in the specific group comprises a plurality of bits, and the processing unit calculates a variation degree of the bits corresponding to each of the bit positions and selects the at least one bit position whose corresponding variation degree(s) is/are smaller than a second threshold as at least one field boundary of the specific group,
   wherein the processing unit further generates a first vector for a specific packet among the packets, the first vector comprises a plurality of bits, the processing unit further generates a plurality of second vectors by circularly shifting the first vector by a plurality of different shift bit numbers, the processing unit further generates a plurality of third vectors by performing the modulo 2 addition on the first vector and each of the second vectors, each of the third vectors comprises a plurality of bits, the processing unit further calculates an accumulated number of the bits whose value is equal to 1 for each of the third vectors, and the processing unit further selects the shift bit number whose corresponding accumulated number is the minimum among the accumulated numbers and is smaller than a count threshold as a periodical property of the specific packet.

2. The packet analysis apparatus of claim 1, wherein the packets included in the specific group define a plurality of byte positions, each of the packets included in the specific group has a packet length, the processing unit further decides a specific field according to a byte number and a specific byte position among the byte positions, and the processing unit further performs the following operations on each of the packets included in the specific group: (a) calculating an evaluation length according to the bits of the packet in the specific field and (b) subtracting the evaluation length, a value representing the specific byte position, and the byte number from the packet length to obtain a difference value, wherein the processing unit further calculates a number of packets whose difference values are smaller than a preset range and determines that the number is greater than a third threshold, wherein the specific field is a length indicator field of the specific group.

3. The packet analysis apparatus of claim 1, wherein the processing unit further decides a numeric sequence of each of the packets according to a cross-correlation value calculation length and the cross-correlation values is calculated by the processing unit according to the numeric sequences, wherein each of the cross-correlation values is an inner product value of the numeric sequences corresponding to two packets among the packets.

4. The packet analysis apparatus of claim 3, wherein the cross-correlation value calculation length is a preset length.

5. The packet analysis apparatus of claim 1, wherein each of the at least one first threshold is related to a subset of the cross-correlation values.

6. The packet analysis apparatus of claim 1, wherein for each of the bit positions, the processing unit calculates a bit value probability according to the bits corresponding to the bit position.

7. The packet analysis apparatus of claim 6, wherein the processing unit further takes the result of subtracting the bit value probability from 0.5 as a bit value bias degree.

8. A packet analysis method, being adapted for an electronic computing apparatus, the packet analysis method comprising the following steps of:
   calculating a plurality of cross-correlation values of a plurality of packets, wherein a format of each of the packets is unknown;
   deciding at least one group according to the cross-correlation values and at least one first threshold, wherein each of the at least one group includes a subset of the packets, the packets included in a specific group among the at least one group define a plurality of bit positions, and each of the packets included in the specific group comprises a plurality of bits;
   calculating a variation degree of the bits corresponding to each of the bit positions;
   selecting the at least one bit position whose corresponding variation degree(s) is/are smaller than a second threshold as at least one field boundary of the specific group;
   generating a first vector for a specific packet among the packets, wherein the first vector comprises a plurality of bits;
   generating a plurality of second vectors by circularly shifting the first vector by a plurality of different shift bit numbers;
   generating a plurality of third vectors by performing the modulo 2 addition on the first vector and each of the second vectors, wherein each of the third vectors comprises a plurality of bits;
   calculating an accumulated number of the bits whose value is equal to 1 for each of the third vectors; and
   selecting the shift bit number whose corresponding accumulated number is the minimum among the accumulated numbers and is smaller than a count threshold as a periodical property of the specific packet.

9. The packet analysis method of claim 8, wherein the packets included in the specific group define a plurality of byte positions, each of the packets included in the specific group has a packet length, and the packet analysis method further comprises the following steps of:
- deciding a specific field according to a byte number and a specific byte position among the byte positions;
- executing the following steps on each of the packets included in the specific group:
- calculating an evaluation length according to the bits of the packet in the specific field; and
- subtracting the evaluation length, a value representing the specific byte position, and the byte number from the packet length to obtain a difference value;
- calculating a number of packets whose difference values are smaller than a preset range; and
- determining that the number is greater than a third threshold;
- wherein the specific field is a length indicator field of the specific group.

10. The packet analysis method of claim 8, further comprising the following steps of:
- deciding a numeric sequence of each of the packets according to a cross-correlation value calculation length;
- wherein the step of calculating the cross-correlation values calculates the cross-correlation values according to the numeric sequences, and wherein each of the cross-correlation values is an inner product value of the numeric sequences corresponding to two packets among the packets.

11. The packet analysis method of claim 10, wherein the cross-correlation value calculation length is a preset length.

12. The packet analysis method of claim 8, wherein each of the at least one first threshold is related to a subset of the cross-correlation values.

13. The packet analysis method of claim 8, further comprising the following step of:
- for each of the bit positions, calculating a bit value probability according to the bits corresponding to the bit position.

14. The packet analysis method of claim 13, further comprising the following step of:
- taking the result of subtracting the bit value probability from 0.5 as a bit value bias degree for each of the bit positions.

15. A non-transitory computer readable medium, having a computer program stored therein, the computer program executing a packet analysis method after being loaded into an electronic computing apparatus, and the packet analysis method comprising the following steps of:
- calculating a plurality of cross-correlation values of a plurality of packets, wherein a format of each of the packets is unknown;
- deciding at least one group according to the cross-correlation values and at least one first threshold, wherein each of the at least one group includes a subset of the packets, the packets included in a specific group among the at least one group define a plurality of bit positions, and each of the packets included in the specific group comprises a plurality of bits;
- calculating a variation degree of the bits corresponding to each of the bit positions;
- selecting the at least one bit position whose corresponding variation degree(s) is/are smaller than a second threshold as at least one field boundary of the specific group;
- generating a first vector for a specific packet among the packets, wherein the first vector comprises a plurality of bits;
- generating a plurality of second vectors by circularly shifting the first vector by a plurality of different shift bit numbers;
- generating a plurality of third vectors by performing the modulo 2 addition on the first vector and each of the second vectors, wherein each of the third vectors comprises a plurality of bits;
- calculating an accumulated number of the bits whose value is equal to 1 for each of the third vectors; and
- selecting the shift bit number whose corresponding accumulated number is the minimum among the accumulated numbers and is smaller than a count threshold as a periodical property of the specific packet.

16. The non-transitory computer readable medium of claim 15, wherein the packets included in the specific group define a plurality of byte positions, each of the packets included in the specific group has a packet length, and the packet analysis method further comprises the following steps of:
- deciding a specific field according to a byte number and a specific byte position among the byte positions;
- executing the following steps on each of the packets included in the specific group:
- calculating an evaluation length according to the bits of the packet in the specific field; and
- subtracting the evaluation length, a value representing the specific byte position, and the byte number from the packet length to obtain a difference value;
- calculating a number of packets whose difference values are smaller than a preset range; and
- determining that the number is greater than a third threshold;
- wherein the specific field is a length indicator field of the specific group.

17. The non-transitory computer readable medium of claim 15, wherein the packet analysis method further comprises the following steps of:
- deciding a numeric sequence of each of the packets according to a cross-correlation value calculation length;
- wherein the step of calculating the cross-correlation values calculates the cross-correlation values according to the numeric sequences, and wherein each of the cross-correlation values is an inner product value of the numeric sequences corresponding to two packets among the packets.

* * * * *